(12) United States Patent
Inoue et al.

(10) Patent No.: US 6,757,454 B2
(45) Date of Patent: Jun. 29, 2004

(54) POLARIZATION DESENSITIZED OPTICAL WAVEGUIDE INTERFEROMETER

(75) Inventors: Yasuyuki Inoue, Tokyo (JP); Yasuaki Hashizume, Tokyo (JP); Yoshinori Hibino, Tokyo (JP); Akio Sugita, Tokyo (JP); Yasuhiro Hida, Tokyo (JP); Hiroshi Takahashi, Tokyo (JP)

(73) Assignees: Nippon Telegraph and Telephone Corporation (JP); NTT Advanced Technology Corporation (JP)

( * ) Notice: Subject to any disclaimer, the term of this patent is extended or adjusted under 35 U.S.C. 154(b) by 112 days.

(21) Appl. No.: 09/958,496

(22) PCT Filed: Feb. 9, 2001

(86) PCT No.: PCT/JP01/00938

§ 371 (c)(1),
(2), (4) Date: Jan. 29, 2002

(87) PCT Pub. No.: WO01/59495

PCT Pub. Date: Aug. 16, 2001

(65) Prior Publication Data

US 2002/0181870 A1 Dec. 5, 2002

(30) Foreign Application Priority Data

Feb. 10, 2000 (JP) ........................................ 2000-034047
Oct. 20, 2000 (JP) ........................................ 2000-321667

(51) Int. Cl.[7] .............................. G02B 6/26; G02B 6/27
(52) U.S. Cl. ............................. 385/15; 385/11; 385/14; 385/43
(58) Field of Search .............................. 385/14, 15, 24, 385/27, 31, 37, 39, 43

(56) References Cited

U.S. PATENT DOCUMENTS 5,719,976 A * 2/1998 Henry et al. .................. 385/50
5,768,450 A * 6/1998 Bhagavatula ................. 385/24
5,943,452 A * 8/1999 Himeno et al. ............... 385/15

(List continued on next page.)

FOREIGN PATENT DOCUMENTS

| JP | 05061076 A | * 3/1993 | ........... G02F/1/313 |
| JP | 5-288946 | 11/1993 | |
| JP | 05288946 A | * 11/1993 | ........... G02B/6/12 |
| JP | 7-230012 | 8/1995 | |
| JP | 2001-51139 | 2/2001 | |

OTHER PUBLICATIONS

"New Focusing and Dispersive Planar Component Based on an Optical Phased Array", Electronic Letters, Mar. 31, 1988 vol. 24, No. 7.*

(List continued on next page.)

Primary Examiner—John D. Lee
(74) Attorney, Agent, or Firm—Ostrolenk, Faber, Gerb & Soffen, LLP

(57) ABSTRACT

A low-cost, high-reliability polarization-independent optical waveguide interferometer is proposed which does not bring about any additional job involved in the insertion of a half-wave plate or excess loss of light. In an optical multi/demultiplexer utilizing optical interference of light waves passing through a plurality of optical waveguides with different lengths, such as an AWG and a Mach-Zehnder interferometer, longitudinal integral values of birefringence values of the individual waveguides, which values are variable or invariable along the waveguides, are made equal for all waveguides 201 and 202. Thus, simply varying the waveguide width can implement polarization-independent operation, or on the contrary implement a polarization beam splitter. For example, the polarization-independent can be implemented by making the core widths, which are averaged in a longitudinal direction of a plurality of optical waveguides with different lengths, wider in a shorter optical waveguide, and narrower in a longer optical waveguide.

16 Claims, 19 Drawing Sheets

U.S. PATENT DOCUMENTS

| | | | | |
|---|---|---|---|---|
| 6,094,513 A | * | 7/2000 | Rigny et al. | 385/24 |
| 6,304,687 B1 | * | 10/2001 | Inoue et al. | 385/14 |
| 6,307,991 B1 | * | 10/2001 | Nolan | 385/50 |
| 6,347,165 B1 | * | 2/2002 | Hyun et al. | 385/15 |
| 2002/0181868 A1 | * | 12/2002 | McGreer | 385/37 |
| 2003/0026518 A1 | * | 2/2003 | Pezeshki et al. | 385/14 |

OTHER PUBLICATIONS

"Polymeric Arrayed–Waveguide Grating Multiplexer Operating Around 1.3 μm", Hida et al., Electronics Letters, Jun. 9, 1994, vol. 30, No. 12.*

"Polarisation Compensated Waveguide Granting Router on InP", Zirngibl et al., Electronics Letters, Sep. 14, 1995, vol. 31, No. 19.*

"Elimination of Polarization Sensitivity in Silica–Based Wavelength Division Multiplexer Using a Polyimide Half Waveplate", Inoue et al., Journal of Lightwave Technology, vol. 15, No. 10 Oct. 1997.*

Polarisation–Insensitive Arrayed–Waveguide Gratings Using Dopant–Rich Silica–Based Glass with Thermal Expansion Adjusted to Si Substrate, Suzuki et al., Electronics Letters, Jun. 19, 1997, vol. 33, No. 13.*

"TUJ17 Laser Trimming Adjustment of Waveguide Birefringence in Silica Integrated–Optic Ring Resonators", Kawachi et al., CLEO '89/Tuesday Poster/84–85.*

"Polarization–Independent Silica–on–Silicon Mach–Zehnder Interometers", Yaffe et al., Journal of Lightwave Technology, vol. 12, No. 1, Jan. 1994.*

* cited by examiner

⇩ MAKE TRANSPARENT BY HEAT TREATMENT

⇩ PATTERNING BY PHOTOLITHOGRAPHY

⇩ REACTIVE-TYPE ION ETCHING

⇩

US 6,757,454 B2

POLARIZATION DESENSITIZED OPTICAL WAVEGUIDE INTERFEROMETER

TECHNICAL FIELD

The present invention relates to an optical waveguide interferometer composed of planar optical waveguides, and more particularly to a technique that compensates for the polarization sensitivity of the optical interferometer, or on the contrary enhances the polarization dependence, by utilizing the dependence of waveguide birefringence on waveguide core width.

BACKGROUND ART

Today, optical wavelength division multiplexing communication systems (WDM systems) utilizing a plurality of optical wavelengths are being developed intensively to increase communication capacity. In the optical wavelength division multiplexing communication systems, arrayed waveguide grating optical wavelength multi/demultiplexers (abbreviated to AWGs from now on) are widely used as optical wavelength multi/demultiplexers for multiplexing a plurality of optical signals with different wavelengths at a transmitting side, and for demultiplexing a plurality of optical signals passing through an optical fiber to different ports at a receiving side.

FIG. 18 shows a circuit configuration of a conventional AWG. Light launched into an input waveguide is diffracted in parallel with a substrate 3 in a first slab optical waveguide 2, and coupled to a plurality of arrayed waveguides 4. Since the adjacent arrayed waveguides 4 have a fixed optical path difference, a plurality of light beams have phase differences depending on the wavelengths when they are coupled to a second slab optical waveguide 5. As a result, the focal points made by the interference between the plurality of light beams change their positions depending on the wavelength. Thus, disposing a plurality of output waveguides 6 at the points of focus in advance makes it possible for the AWG to function as an optical wavelength multi/demultiplexer for multiplexing or demultiplexing the plurality of optical wavelengths in the block.

In the reported AWGs at present, the plurality of arrayed waveguides 4 are designed to have the same core width. The AWGs are fabricated using waveguides of a variety of materials such as glass, polymer and semiconductors, and their results are reported (M. K. Smit, "New focusing and dispersive planar component based on an optical phased array," Electronics Letters, vol. 24, no. 7, pp. 385–386, March 1988; Y. Hida, et al., "Polymeric arrayed-waveguide grating multiplexer operating around 1.3 mm," Electronics Letters, vol. 30, pp. 959–960, 1994; and M. Zirngibl, et al., "Polarization compensated waveguide grating router on InP," Electronics Letters, vol. 31, no. 19, pp. 1662–1664, 1995).

Generally, an optical waveguide formed on a planar substrate has different effective refractive indices for the TM light with an electric field component vertical to the substrate and for the TE light with an electric field component parallel to the substrate. The difference between the effective refractive indices is called waveguide birefringence, and defined by the following equation (1).

$$B = n_{TM} - n_{TE} \quad (1)$$

where B is the waveguide birefringence, and $n_{TM}$ and $n_{TE}$ are the effective refractive indices of the TM light and TE light.

The waveguide birefringence is caused by stress-induced birefringence, structural birefringence or the like.

AWG center wavelengths of the TM light and TE light are expressed by the following equations (2) and (3).

$$\lambda_{TM} = \frac{n_{TM} \cdot \Delta L}{m} \quad (2)$$

$$\lambda_{TE} = \frac{n_{TE} \cdot \Delta L}{m} \quad (3)$$

where $\lambda_{TM}$ and $\lambda_{TE}$ are the AWG center wavelengths of the TM light and TE light, $\Delta L$ is the length difference between adjacent arrayed waveguides, and m is a diffraction order (integer).

As seen from the foregoing equations (1)–(3), when the waveguide birefringence B is present, the AWG center wavelengths $\lambda_{TM}$ and $\lambda_{TE}$ of the TM light and TE light differ from each other. Basically, a silica-based glass waveguide has little dependence of a propagation loss on the polarization. However, since the center wavelengths differ for the TM light and TE light, the AWG has a problem of the polarization sensitivity that its characteristic changes depending on the polarization state of incident light.

(First Example of Conventional Technique)

FIG. 19 shows a method of eliminating the polarization dependence. It inserts into the arrayed waveguide 4 a half-wave plate 7 whose principal axis inclines 45° at the center of the AWG via a groove 8 (Y. Inoue, et al., "Polarization sensitivity elimination in silica-based wavelength-division multiplexer using polyimide half waveplate," IEEE J. Lightwave Technol., vol. 15, no. 10, pp. 1947–1957, October 1997).

The half-wave plate 7 operates as a polarization mode converter between the TM light and the TE light so that the polarization sensitivity is eliminated by exchanging the TM light and the TE light at the center of the AWG to average the overall characteristic.

(Second Example of Conventional Technique)

Another method of eliminating the polarization sensitivity of the AWG is reported. It reduces the thermal stress in the fabrication process of the AWG by providing the silica-based glass with a thermal expansion coefficient corresponding to the thermal expansion coefficient of the silicon substrate by adding much dopant to the silica-based glass, thereby eliminating the polarization sensitivity (S. Suzuki, et al., "Polarization-insensitive arrayed-waveguide gratings using dopant-rich silica-based glass with thermal expansion adjusted to Si substrate," IEE Electron. Lett., vol. 33, no. 13, pp. 1173–1174, June 1997).

More specifically, adjusting the stress imposed on the silica-based glass layer from the silicon substrate to a value between −1 Mpa and 1 Mpa enables the absolute value of the waveguide birefringence to be limited equal to or less than $2 \times 10^{-5}$, where the negative sign designates compressive stress and the positive sign designates tensile stress.

The second method of the conventional technique is a more promising candidate than the first method of the conventional technique because it obviates the additional step involved in inserting the half-wave plate 7, and prevents excess loss as well. The second method, however, has a problem of readily causing cracks in the silica-based glass layer during the fabrication process of the AWG because the compressive stress of the glass is very weak. In addition, since the silica-based glass layer contains a lot of dopant, it is poor in long term weather resistance, and brings about crystallization in the waveguide which will increase the optical insertion loss of the waveguide. The low reliability is a critical problem with the optical communication component to be solved urgently.

In summary, the two methods of achieving the polarization-independence described in the conventional techniques have the problems to be solved. The first conventional method using the half-wave plate has a problem of requiring the additional step involved in inserting the half-wave plate, and of bringing about the excess loss of light. On the other hand, the second conventional method of eliminating the thermal stress of the glass by increasing the dopant of the silica-based glass has a problem of its reliability.

The present invention is implemented to solve the foregoing problems. Therefore, an object of the present invention is to provide a low cost, high reliability, polarization-independent optical waveguide interferometer.

DISCLOSURE OF THE INVENTION

We found that the waveguide birefringence varies depending on the core width. Utilizing this phenomenon, the present invention solves the problem of polarization sensitivity of the AWG without additional job or component. More specifically, the polarization sensitivity of the AWG is eliminated by varying the effective core widths of the waveguides of the arrayed waveguide one by one.

To accomplish the object, according to a first aspect of the present invention, there is provided an optical waveguide interferometer composed of optical waveguides on a substrate, wherein the optical interferometer comprises an optical branching section, a plurality of optical waveguides with different lengths, and an optical coupling section, and wherein core widths averaged in a longitudinal direction of the plurality of optical waveguides with different lengths differ from one another.

According to a second aspect of the present invention, there is provided an optical waveguide interferometer composed of optical waveguides on a substrate, wherein the optical interferometer comprises an optical branching section, a plurality of optical waveguides with different lengths, and an optical coupling section, and wherein core widths averaged in a longitudinal direction of the plurality of optical waveguides with different lengths are wider in shorter optical waveguides and narrower in longer optical waveguides.

Here, longitudinal integral values of birefringence of the plurality of optical waveguides with different lengths may be equal to one another among the plurality of optical waveguides.

The optical waveguide interferometer may be an arrayed waveguide grating optical wavelength multi/demultiplexer including two slab waveguides and a plurality of arrayed waveguides with different lengths each other interconnecting said slab waveguides, and core widths of the plurality of arrayed waveguides may differ from one another depending on lengths of the arrayed waveguides, and each core width may be fixed except for connecting sections with the slab waveguides.

The optical waveguide interferometer maybe an arrayed waveguide grating optical wavelength multi/demultiplexer including two slab waveguides and a plurality of arrayed waveguides with different lengths each other interconnecting said slab waveguides, and the plurality of arrayed waveguides may be each composed of waveguides with two-types of core widths except for connecting sections with the slab waveguides, and a ratio between lengths of the waveguides with the two-types may differ from one another among the plurality of arrayed waveguides.

The optical waveguide interferometer may be an arrayed waveguide grating optical wavelength multi/demultiplexer including a first slab waveguide, a second slab waveguide, a plurality of arrayed waveguides that interconnect them and have different length from one another, at least one input waveguide connected to the first slab waveguide, and at least one output waveguide connected to the second slab waveguide, and core widths averaged in a longitudinal direction of the plurality of arrayed waveguides may be wider in shorter optical waveguides and narrower in longer optical waveguides, and as a result of this, longitudinal integral values of birefringence of the plurality of arrayed waveguides may be equal to one another among the plurality of arrayed waveguides.

The plurality of arrayed waveguides may each have a constant core width in their longitudinal directions except for connecting sections with the first and second slab waveguides.

The plurality of arrayed waveguides may be each composed of waveguides with at least two-types of core widths except for connecting sections with the first and second slab waveguides, and a ratio between lengths of the waveguides with the at least two-types may differ from one another among the plurality of arrayed waveguides.

The waveguides with the at least two-types of the core widths may be interconnected by a tapered section that continuously changes its width.

A tapered section interconnecting the waveguides with different core widths may be composed of a plurality of waveguides that have different widths and are connected serially to one another.

The plurality of arrayed waveguides with different lengths from one another may each include a straight line waveguide at their central section.

The optical waveguide interferometer may be a Mach-Zehnder interferometer including two optical couplers, and two optical waveguides that interconnect them and have different lengths, and the two optical waveguides may have core widths different from each other at least in part, and an averaged core width of the shorter waveguide may be wider than an averaged core width of the longer waveguide.

The optical waveguide interferometer may be a Mach-Zehnder interferometer including two optical couplers, and two optical waveguides that interconnect them and have different lengths, and the two optical waveguides may have core widths different from each other at least in part, and longitudinally integral values of birefringence of the two optical waveguides may differ from each other by half optical wavelength used.

The optical waveguide interferometer may be composed of silica-based glass optical waveguides on a silicon substrate.

An internal stress of a core film constituting each optical waveguides of the optical waveguide interferometer may be two times greater than an internal stress of an upper cladding film.

BEST MODE FOR CARRYING OUT THE INVENTION

The embodiments in accordance with the present invention will now be described with reference to the accompanying drawings.

(First Embodiment)

Figure 1:
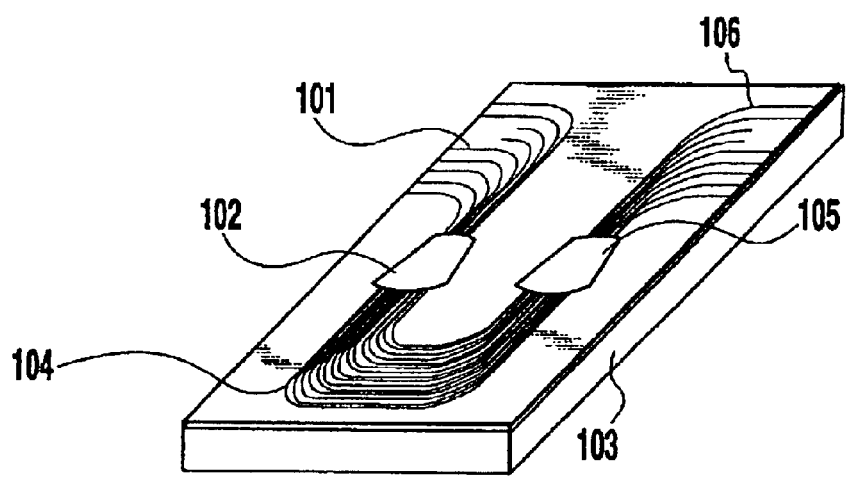
FIG. 1 is a perspective view showing a structure of a polarization-independent AWG (arrayed waveguide grating optical wavelength multi/demultiplexer) of a first embodiment in accordance with the present invention.
Figure 18:
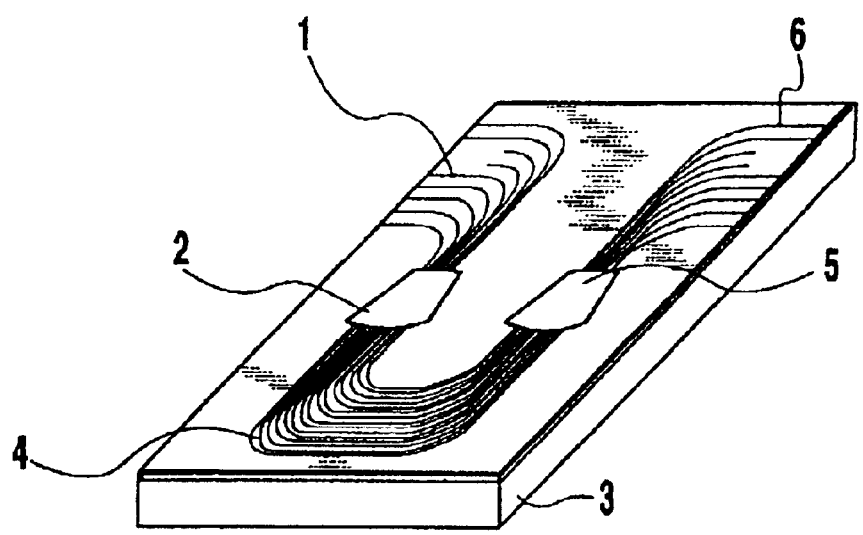
FIG. 18 is a perspective view showing a structure of a conventional AWG.
Figure 19:
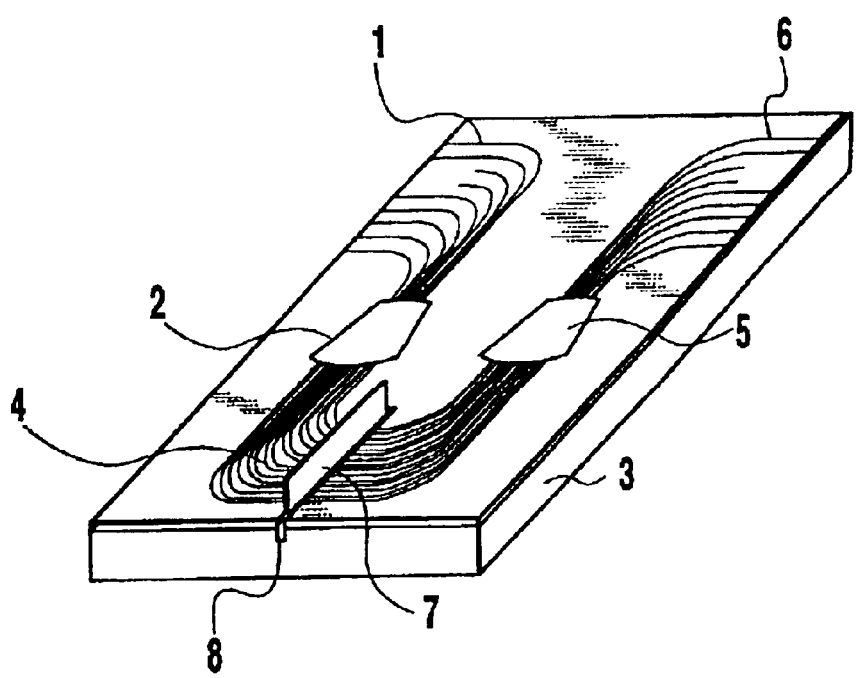
FIG. 19 is a perspective view showing a structure of another conventional AWG.

FIG. 1 shows a circuit configuration of a polarization-independent AWG (arrayed waveguide grating optical wavelength multi/demultiplexer) of the first embodiment in accordance with the present invention. The AWG comprises a hundred arrayed waveguides 104. The core widths of the arrayed waveguides 104 differ from each other except for tapers (not shown) at connecting sections with slab waveguides 102 and 105. The remaining configuration is the same as that of the conventional AWG as shown in FIG. 18. Here, the reference numeral 101 designates input waveguides, 102 designates an input side slab waveguide, 103 designates a silicon substrate, 105 designates an output side slab waveguide and 106 designates output waveguides.

Figure 2:
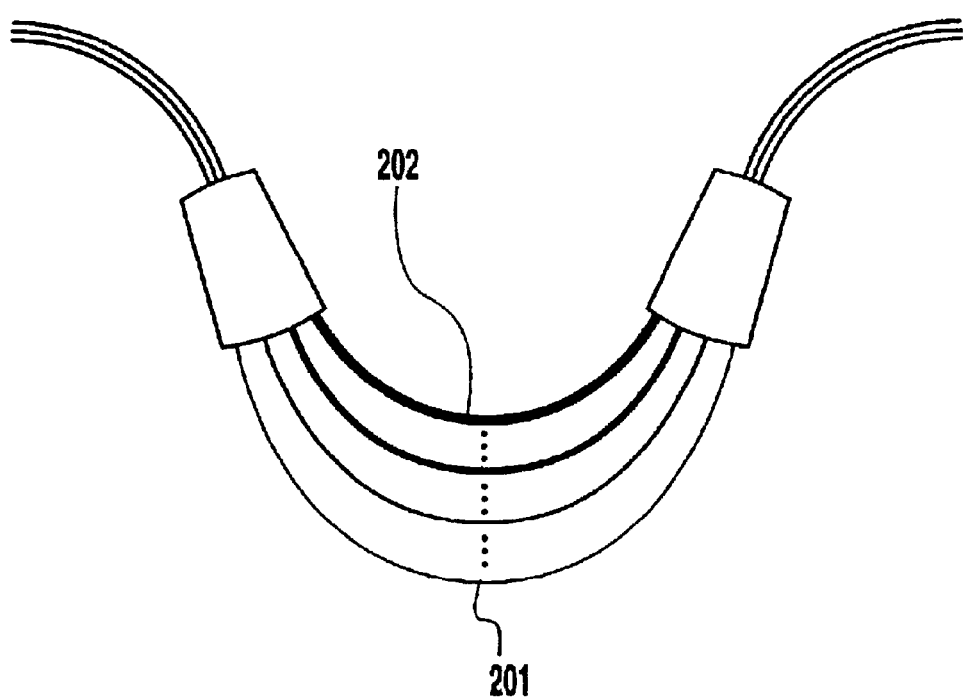
FIG. 2 is an upside plane view emphasizing the core widths in the arrayed waveguide of the polarization-independent AWG of FIG. 1.

FIG. 2 is an upside plane view emphasizing the core widths of the arrayed waveguides of FIG. 1. As shown in FIG. 2, the core widths of the arrayed waveguides 104 are designed such that they are gradually thinned from the inside (shorter arrayed waveguide side) to outside (longer arrayed waveguide side). In FIG. 2, the reference numeral 202 designates the innermost arrayed waveguide with a core width of 8.2 micrometers, and 201 designates the outermost arrayed waveguide with the core width of 5.8 micrometers.

Figure 3:
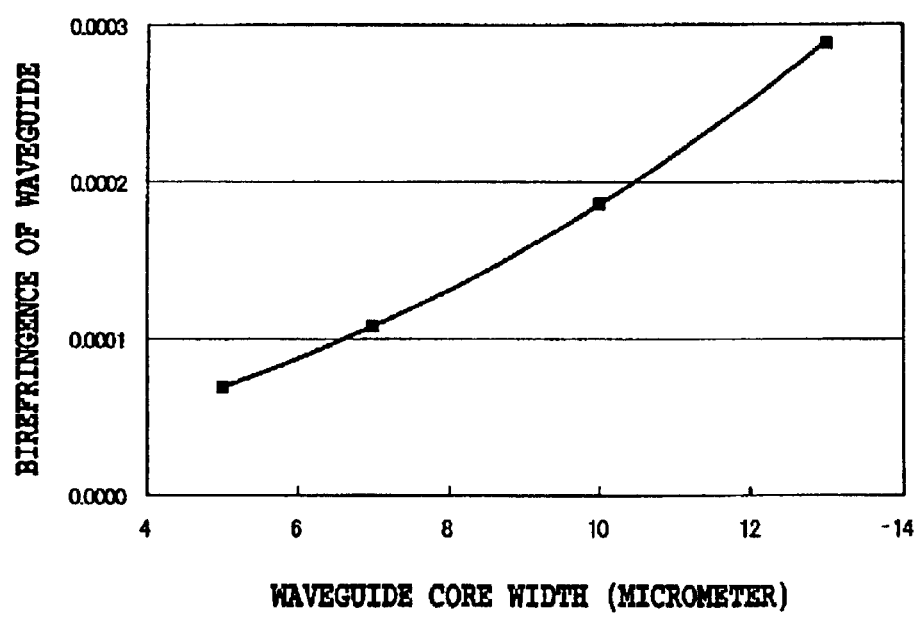
FIG. 3 is a graph illustrating the dependence of the waveguide birefringent index on the core width in terms of relationships between the waveguide birefringent index and the waveguide core width.

FIG. 3 illustrates relationships between the waveguide birefringence B and core width w, which triggers the present invention. FIG. 3 shows that the waveguide birefringence B increases with the waveguide core width w. The dependence of the waveguide birefringence on the core width is just opposite to the dependence of the structural birefringence on the core width. That is, the structural birefringence decreases with the core width. This indicates that the waveguide birefringence of the present embodiment is stress-induced birefringence.

The stress-induced birefringence is strongly dependent not only on the material of the core glass, cladding glass and substrate, but also on the coefficient of thermal expansion. The present embodiment utilizes such materials as meeting the condition that the internal stress of the core glass film is twice or more greater than that of the cladding glass film.

The dependence of the waveguide birefringence on the core width as illustrated in FIG. 3 will now be described. Intuitively, in a region where the core width is much smaller than the core thickness (as an extreme example, when the core width is zero), the waveguide birefringence is governed by the internal stress of the cladding glass film. In contrast, in a region where the core width is much greater than the core thickness (as an extreme example, when the core width is infinite), the waveguide birefringence is governed by the internal stress of the core glass film. In the present embodiment, since the internal stress of the core glass film is much greater than that of the cladding glass film, the dependence arises that the waveguide birefringence increases with the core width.

The present invention relates to a method that utilizes the dependence of the waveguide birefringence on the core width as illustrated in FIG. 3 we discovered this time, to make the center wavelength $\lambda_{TM}$ of the TM light equal to the center wavelength $\lambda_{TE}$ of the TE light without reducing the waveguide birefringence to zero.

Figure 4A:
FIGS. 4A–4E are process diagrams showing a fabrication steps of the polarization-independent AWG of the first embodiment in accordance with the present invention.

The fabrication process of the waveguide of the present embodiment will be described briefly with reference to FIGS. 4A–4E. A lower cladding glass soot 401 mainly composed of $SiO_2$ and a core glass soot 402 composed of $SiO_2$ with additional $GeO_2$ are deposited on a silicon substrate 103 by flame hydrolysis deposition method (FIG. 4A).

Figure 4B:
Figure 4C:
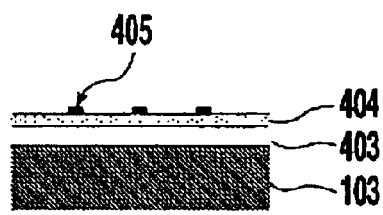

Subsequently, glass transparency is carried out at a temperature higher than 1000° C. In this case, the deposition of the glass is conducted such that the lower cladding glass layer 403 becomes 30 micrometer thick, and the core glass 404 becomes seven micrometer thick (FIG. 4B).

Figure 4D:
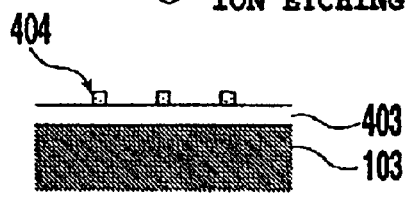

After that, an etching mask 405 is formed on the core glass 404 by a photolithography technique (FIG. 4C), followed by making a circuit pattern with the core glass 404 by reactive ion etching (FIG. 4D).

Figure 4E:
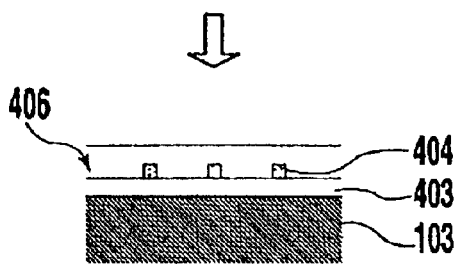

After removing the etching mask 405, an upper cladding glass 406 is formed by the flame hydrolysis deposition method. To the upper cladding glass 406 is added a dopant such as $B_2O_3$ or $P_2O_5$ to reduce the transition temperature of the glass so that the upper cladding glass 406 enters narrow gaps between the core glass 404 and core glass 404 (FIG. 4E).

As described in connection with the conventional technique, adding a large volume of dopant to the cladding glass will relieve compressive stress imposed on the glass layer from the silicon substrate, thereby reducing the waveguide birefringence. However, the weather resistance of the glass is also deteriorated. In view of this, the present embodiment limits the amount of the dopant added to the cladding glass 406 as a condition of securing sufficient reliability. Specifically, it produces the stress of less than −10 MPa (compressive stress greater than 10 MPa) from the silicon substrate 103 to the glass layer.

Next, the design of the arrayed waveguide will be described. In the AWG, a design is made such that the optical path difference between the adjacent arrayed waveguides becomes constant. In this case, the center wavelengths $\lambda_{TM}$ and $\lambda_{TE}$ of the TM mode and the TE mode are expressed by the following equations (4) and (5).

$$\lambda_{TM} = \frac{1}{m} \cdot \left( \int_0^{L_{k+1}} n_{TM} \cdot dx - \int_0^{L_k} n_{TM} \cdot dx \right) \quad (4)$$

$$\lambda_{TE} = \frac{1}{m} \cdot \left( \int_0^{L_{k+1}} n_{TE} \cdot dx - \int_0^{L_k} n_{TE} \cdot dx \right) \quad (5)$$

where, $L_k$ and $L_{k+1}$ are lengths of kth and (k+1)th arrayed waveguides. Therefore, conditions for eliminating the deviation between the center wavelengths caused by polarization is that the right-hand side of equations (4) and (5) becomes equal. In other words, when the following equation (6) is satisfied, the deviation between the center wavelengths due to the polarization is eliminated, thereby eliminating the polarization sensitivity of the AWG.

$$\int_0^{L_k} B \cdot dx = const. \quad (6)$$

where B is the waveguide birefringence given by equation (1). Equation (6) means that the polarization sensitivity is eliminated if the longitudinally integrated birefringence takes a constant value for different arrayed waveguides.

In the present embodiment, since the arrayed waveguides are designed such that they each have a constant core width longitudinally, equation (6) are reduced to the following equation (7).

$$B_k \cdot L_k = const. \quad (7)$$

where $B_k$ is the birefringence of the kth arrayed waveguide.

Equation (7) expresses that the polarization sensitivity of the AWG can be eliminated by setting the birefringence of a shorter arrayed waveguide at a larger value, and that of a longer arrayed waveguide at a smaller value. Designing a 100-GHz-spaced 16-channel AWG to satisfy equation (7) using the result of FIG. 3 gives the core width of 5.8 micrometers for the longest arrayed waveguide 201 and the core width of 8.2 micrometers for the shortest arrayed waveguide 202 as shown in FIG. 2.

Generally speaking, it is necessary for the AWG to have a fixed optical path difference between adjacent arrayed waveguides. In the conventional design in which all the arrayed waveguides have the same core width, all the arrayed waveguides have the same effective refractive index, giving the fixed physical length difference between the adjacent arrayed waveguides. The present design, however, has different arrayed waveguide core widths from each other, thus giving different effective refractive indices. Therefore, the physical length difference between the adjacent arrayed waveguides is not necessarily constant. More specifically, when the effective refractive indices are proportional to the core widths, the physical length difference between the adjacent arrayed waveguides becomes constant. However, when the effective refractive indices are not proportional to the core widths, the physical length difference between the adjacent arrayed waveguides does not become constant. In the present embodiment, since the effective refractive indices are not proportional to the core widths, the physical length difference between the adjacent arrayed waveguides is not constant.

Figure 5:
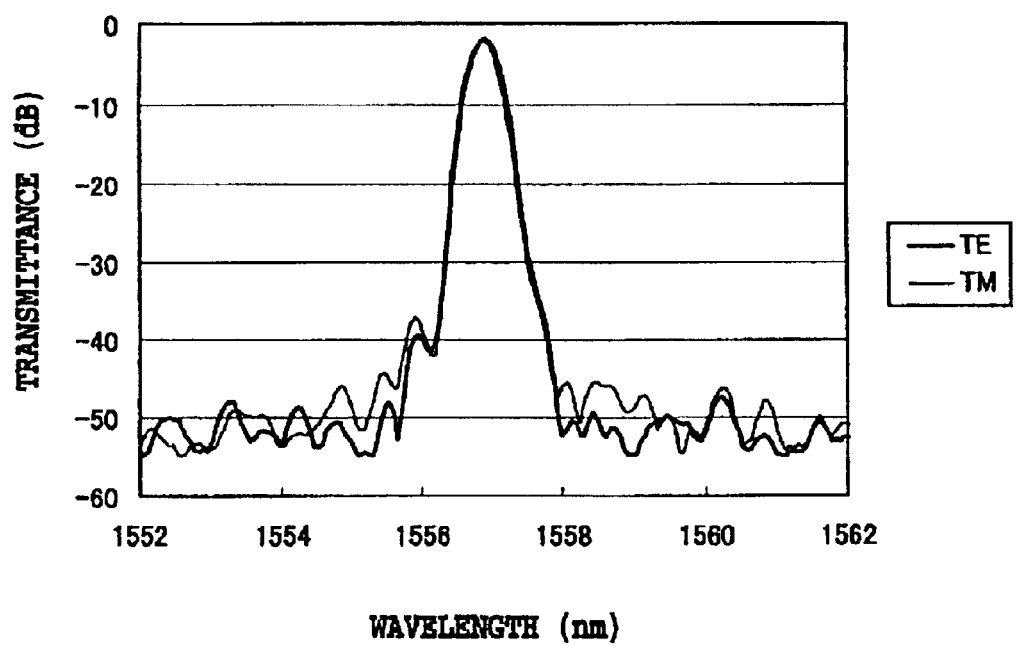
FIG. 5 is a graph illustrating transmittance spectrum characteristics of the polarization-independent AWG of the first embodiment in accordance with the present invention in terms of the relationships between the transmittance and the wavelength.
Figure 6:
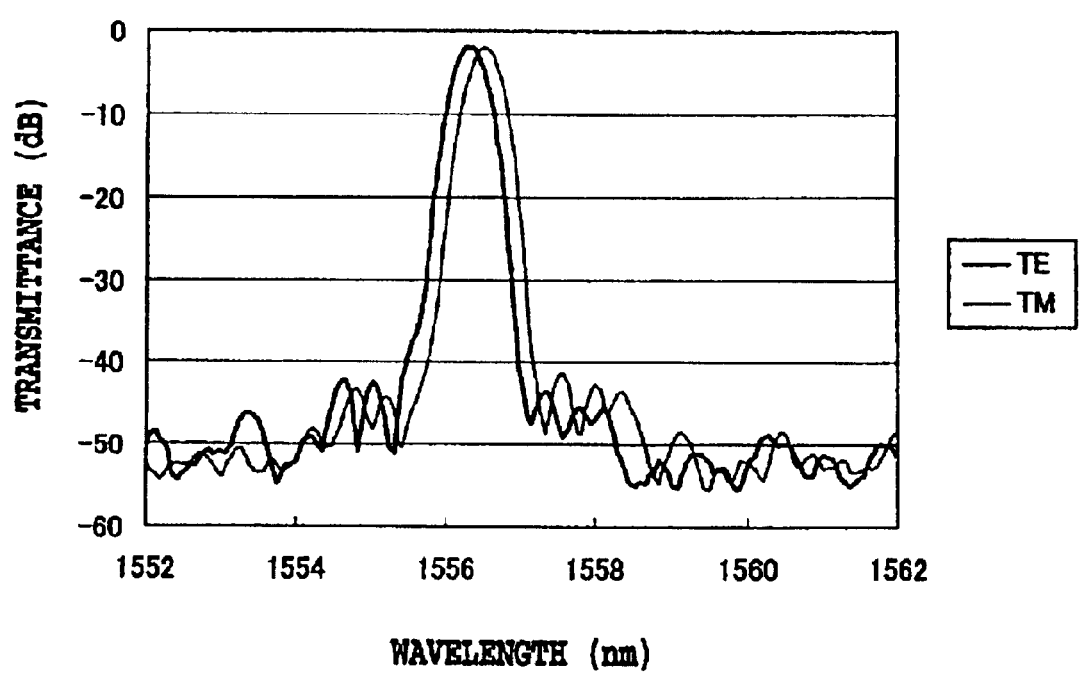
FIG. 6 is a graph illustrating transmittance spectrum characteristics of an AWG with a uniform core width (7.0 micrometers) in terms of the relationships between the transmittance and the wavelength, as a comparison with the first embodiment in accordance with the present invention of FIG. 5.

FIG. 5 illustrates transmission spectra of the AWG fabricated using the foregoing design method. The deviation between the wavelengths $\lambda_{TM}$ and $\lambda_{TE}$ is less than 0.007 nm (the limits of measurement). Transmission spectra of a conventional AWG that is fabricated using a uniform core width (7.0 micrometers) are shown in FIG. 6 for the purpose of comparison. The deviation between the wavelengths $\lambda_{TM}$ and $\lambda_{TE}$ is 0.12 nm. Comparing FIG. 5 and FIG. 6 finds that the design satisfying equation (7) about the core widths can eliminate the polarization sensitivity of the AWG.

The present invention is characterized in that the polarization sensitivity of the optical waveguide interferometer can be eliminated by controlling the finite waveguide birefringence by varying core width in accordance with the length of the arrayed waveguides without making the waveguide birefringence zero. As a control method of the birefringence of the waveguides, the following methods are proposed. First, a method using a stress imposing film is known (M. Kawachi, et al., "Laser trimming adjustment of waveguide birefringence in silica integrated-optic ring resonators," Proc. CLEO '89, pp. 84–85, 1989). Second, a method is known of installing different types of thin films beneath the core (H. H. Yaffe, et al., "Polarization-independent silica-on-silicon Mach-Zehnder interferometers," Journal of Lightwave Technology, vol. 12, pp. 64–67, 1994). The present invention, however, has a major characteristic in that the polarization sensitivity of the AWG can be eliminated by controlling the waveguide birefringence by only varying the core width which is a mask design parameter without any additional process such as the conventional methods.

(Second Embodiment)

Figure 7:
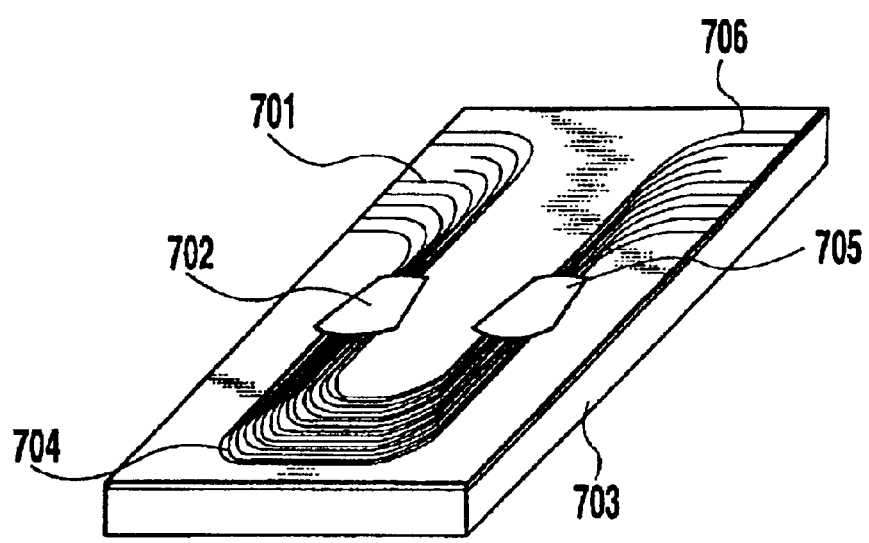
FIG. 7 is a perspective view showing a structure of a polarization-independent AWG of a second embodiment in accordance with the present invention.

FIG. 7 shows a polarization-independent AWG of a second embodiment in accordance with the present invention. In FIG. 7, the reference numeral 701 designates input waveguides; 702 designates an input side slab waveguide; 703 designates a silicon substrate; 704 designates arrayed waveguides; 705 designates an output side slab waveguide; and 706 designates output waveguides. The appearance of the AWG of the present embodiment is identical to that of the AWG of the first embodiment as shown in FIG. 1. However, although the core widths of the arrayed waveguides differ from each other in the first embodiment, the second embodiment is characterized in that it uses the arrayed waveguides with two-types of core widths, and varies the ratio between the lengths of the two to equivalently vary the waveguide birefringence between the arrayed waveguides. In addition, to reduce the connection loss among the waveguides with the two-types of the core widths, a tapered section that varies its width continuously is provided between both waveguides individually. Inserting the tapered section enables the excess connection loss between the two core widths to be greatly reduced from 0.5 dB to less than 0.1 dB.

Figure 8:
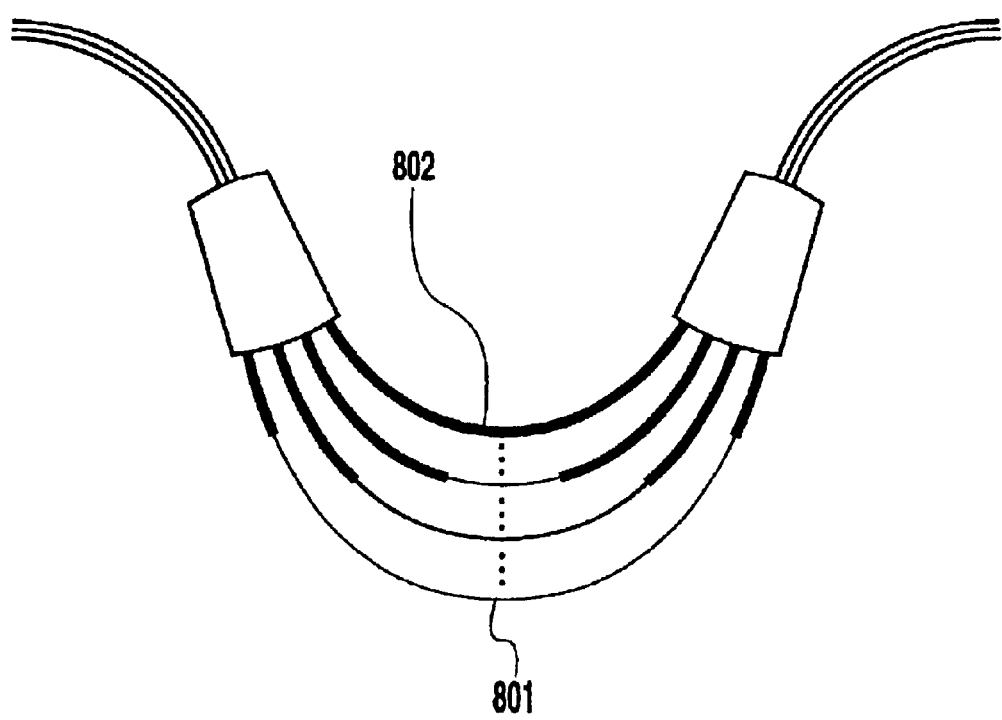
FIG. 8 is an upside plane view emphasizing the core widths in the arrayed waveguides of the polarization-independent AWG of FIG. 7.

FIG. 8 is an upside plane view emphasizing the core widths of the arrayed waveguides 704. In the present embodiment, a design is made using a waveguide 801 with a core width $w_1$=5.5 micrometers and a waveguide 802 with a core width $w_2$=8.5 micrometers.

In the second embodiment, the following equation (8) is used instead of equation (7).

$$B(w_1) \cdot L_k(w_1) + B(w_2) L_k(w_2) = const. \quad (8)$$

where $L_k(w_1)$ and $L_k(w_2)$ are the length of the section with the core width of 5.5 micrometers and that of the section with the core width of 8.5 micrometers in the kth arrayed waveguide; and $B(w_1)$ and $B(w_2)$ are the birefringence of the section with the core width of 5.5 micrometers and the birefringence of the section of the core width of 8.5 micrometers.

Furthermore, the optical path difference between adjacent arrayed waveguides is given by the following expression.

$$m\lambda = n(w_1)\Delta L(w_1) + n(w_2)\Delta L(w_2)$$

where $\alpha L(w_1)$ is the length difference between the 5.5 micrometer wide waveguides 801 of the adjacent arrayed waveguides, and $\Delta L(w_2)$ is the length difference between the 8.5 micrometer wide waveguides 802 of the adjacent arrayed waveguides. From this expression and equation (8), $\Delta L(w_1)$ and $\Delta L(w_2)$ are given by the following equations (9) and (10).

$$\Delta L(w_1) = L_{k+1}(w_1) - L_k(w_1) = \frac{B(w_2) \cdot m \cdot \lambda_{TM}}{B(w_2) \cdot n_{TM}(w_1) - B(w_1) \cdot n_{TM}(w_2)} \quad (9)$$

$$\Delta L(w_2) = L_{k+1}(w_2) - L_k(w_2) = \frac{-B(w_1) \cdot m \cdot \lambda_{TM}}{B(w_2) \cdot n_{TM}(w_1) - B(w_1) \cdot n_{TM}(w_2)} \quad (10)$$

In the 100-GHz-spaced 1×16-channel AWG actually fabricated, they are determined as $\Delta L(w_1)$=149 micrometers and $\Delta L(w_2)$=−86 micrometers.

Although the physical length difference between the adjacent arrayed waveguides is not fixed in the first embodiment, it becomes fixed in the present embodiment as shown by equations (9) and (10).

Figure 9:
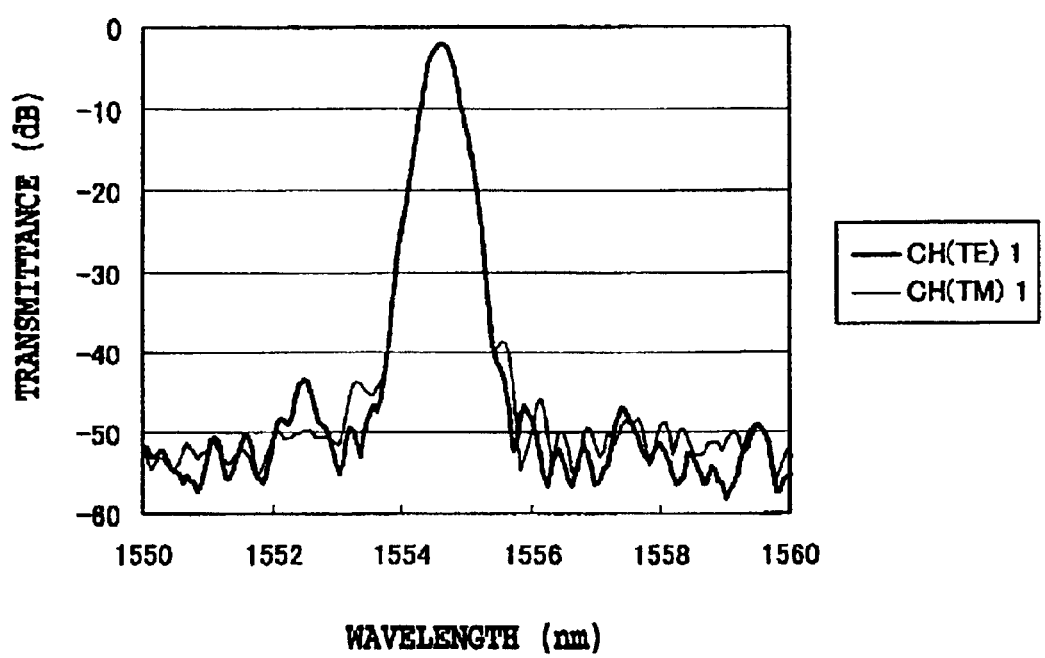
FIG. 9 is a graph illustrating transmittance spectrum characteristics of the polarization-independent AWG of the second embodiment in accordance with the present invention in terms of the relationships between the transmittance and wavelength.

The AWG of the second embodiment is substantially identical to the AWG of the first embodiment, and their transmission spectra are also nearly equal. FIG. 9 shows transmission spectra of an actually fabricated AWG of the second embodiment. Comparing with the transmission spectra of FIG. 6 of the conventional AWG, it is obvious that the polarization sensitivity is eliminated.

Compared with the first embodiment, the second embodiment interconnects the waveguides with different core widths at the intermediate positions of the arrayed waveguides, thereby bringing about excess insertion loss of about 0.1 dB which seems to arise at the interconnected positions. However, the excess loss is small enough compared with the total insertion loss, thereby presenting no substantial problem.

The AWG of the second embodiment is superior to the first embodiment in that it allows the design using only two-types of the core widths, and its design becomes easier because of the constant $\Delta L(w_1)$ and $\Delta L(w_2)$.

Although the second embodiment employs two-types of the core widths in designing the arrayed waveguides, this is not essential. For example, three or more core widths can be used to design the arrayed waveguide.

(Third Embodiment)

Figure 10:
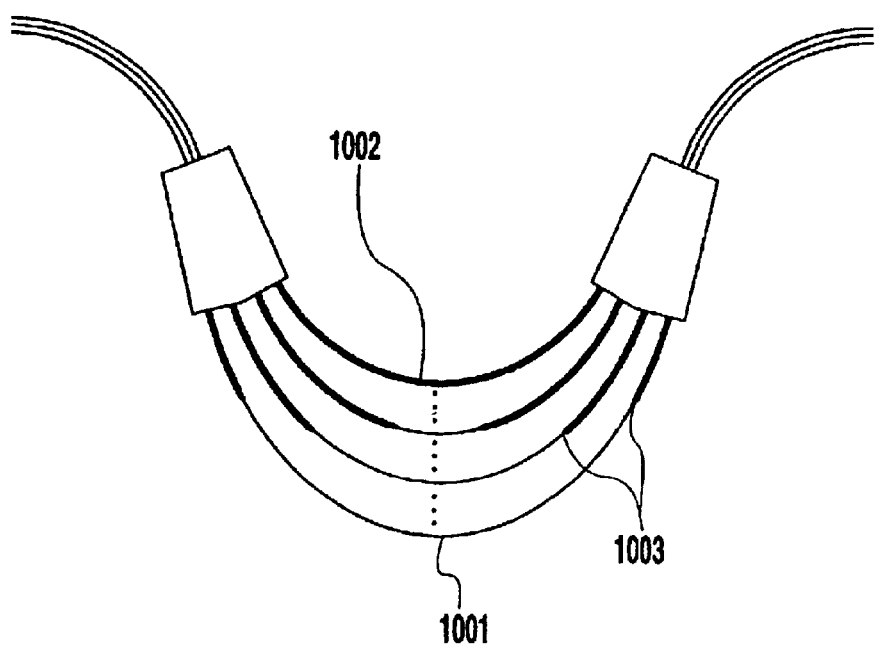
FIG. 10 is an upside plane view emphasizing the core widths in the arrayed waveguides of the polarization-independent AWG of a third embodiment in accordance with the present invention.
Figure 11:
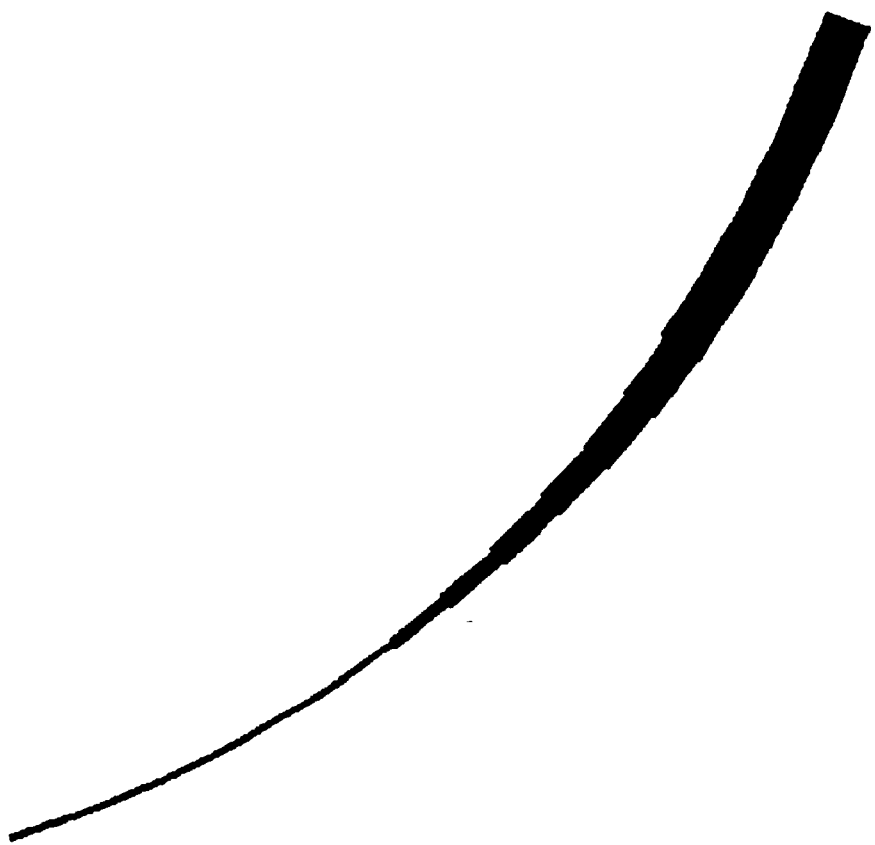
FIG. 11 is an enlarged view of a tapered section of the arrayed waveguide of the polarization-independent AWG of the third embodiment in accordance with the present invention.

FIG. 10 shows a polarization-independent AWG of a third embodiment in accordance with the present invention. The polarization-independent AWG of the third embodiment is nearly identical to the polarization-independent AWG of the second embodiment. It differs in that the tapered sections at the junctions between the waveguides with different widths are designed stepwise consisting of a plurality of different width waveguides instead of designed them using smooth curves. FIG. 11 is an enlarged view showing a tapered section.

Although the taper with smooth curve used in the second embodiment has a smaller loss theoretically, it has a problem of complicating the design involved in forming the taper on the curvilinear waveguide section using smooth curves. Thus, as a practical method of preventing the excess loss, the present embodiment forms the tapered section by connecting the waveguides with varying the width stepwise from the 8.5 micrometer wide waveguide to the 5.5 micrometer wide waveguide at a step of 0.3 micrometer.

An actually fabricated device achieved substantially the same loss and transmission spectra as the second embodiment.

(Fourth Embodiment)

Figure 12:
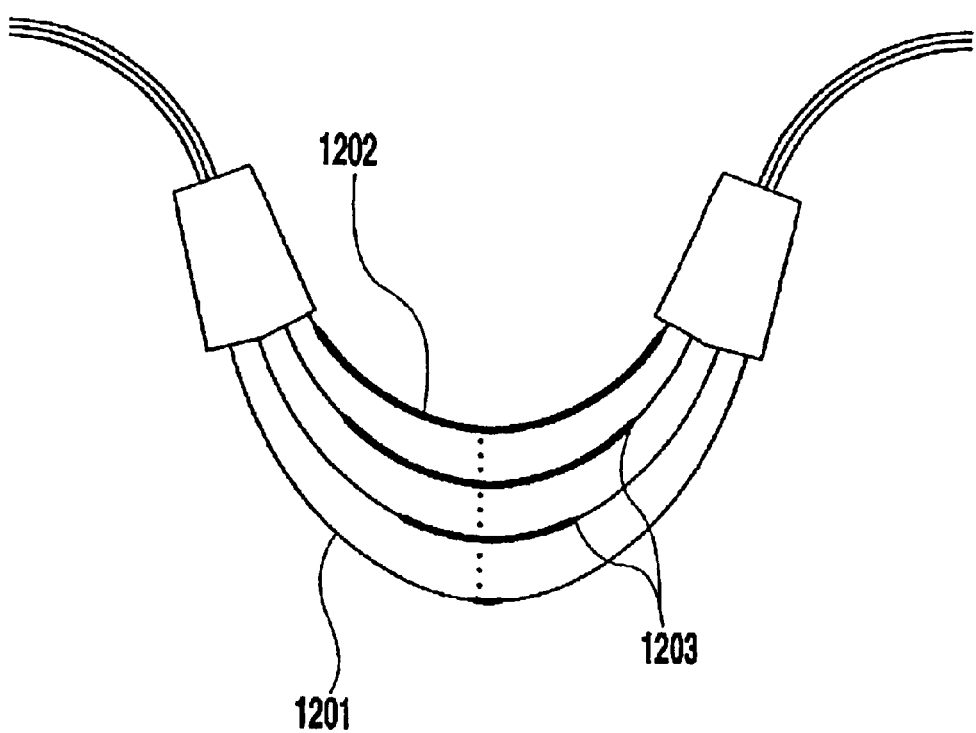
FIG. 12 is an upside plane view emphasizing the core widths in the arrayed waveguides of the polarization-independent AWG of a fourth embodiment in accordance with the present invention.

FIG. 12 shows a polarization-independent AWG of a fourth embodiment in accordance with the present invention. The principle of the polarization-independent AWG of the fourth embodiment is the same as that of the third embodiment. They differ only in the following: Although the polarization-independent AWG of the third embodiment disposes the wider waveguide (8.5 micrometer wide waveguide in the embodiment) at the slab side of the arrayed waveguide, and the narrower waveguide (5.5 micrometer wide waveguide in the embodiment) at the center of the arrayed waveguide, the present fourth embodiment disposes, on the contrary, the wider waveguide at the center of the arrayed waveguide, and the narrower waveguide at the slab side of the arrayed waveguide.

The structure of the present embodiment can reduce optical coupling between the arrayed waveguides, thereby increasing the yield.

(Fifth Embodiment)

Figure 13:
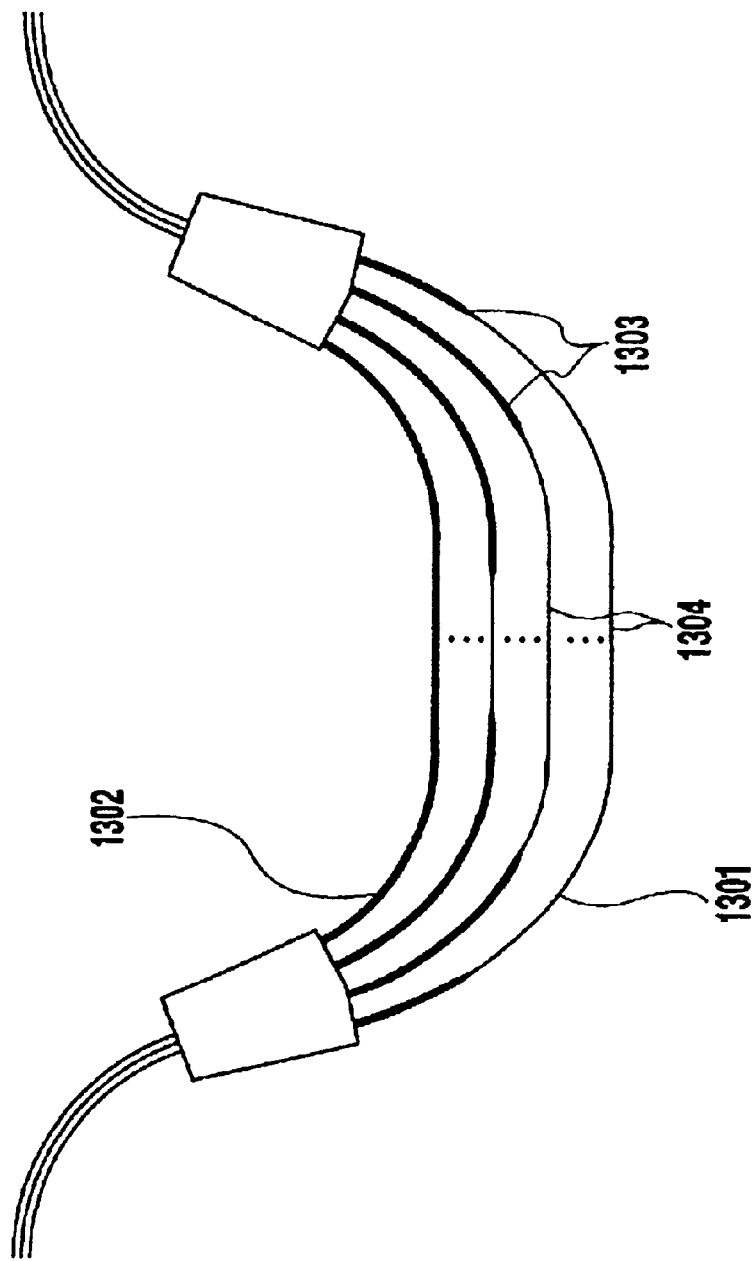
FIG. 13 is an upside plane view emphasizing the core widths in the arrayed waveguides of the polarization-independent AWG of a fifth embodiment in accordance with the present invention.

FIG. 13 shows a polarization-independent AWG of a fifth embodiment in accordance with the present invention. The polarization-independent AWG in accordance with the present invention must satisfy equation (7) or (8). For example, when using the two-types of the waveguides of 5.5 micrometers wide and 8.5 micrometers wide, the ratio of the shortest arrayed waveguide length $L_1$ and the longest arrayed waveguide length $L_N$ is given by the following equation (11) from the birefringence of the two.

$$L_1 : [L_2] L_N = B(W_1) : B(W_2)$$

However, when the spacing between the channel wavelengths is reduced, and the number of channels increases, the ratio between $L_1$ and $L_N$ must be made greater than the value given by equation (11). In other words, the ratio between $L_1$ and $L_N$ given by equation (11) limits the degree of design freedom of the AWG.

To solve the problem, the present embodiment provides a central section of each arrayed waveguide with a straight line section to alleviate the limitation of equation (11). Thus, the ratio $L_1-L_S:L_N-L_S$ between the lengths except for the straight line section, where $L_S$ is the length of the straight line section, can be freely designed with the ratio $L_1:L_N$ satisfying equation (11) by arbitrarily setting $L_S$.

For example, when the central section of the arrayed waveguide is not provided with the straight line section, the design limit is a 50-GHz-spaced 40 channels. However, when the central section of the arrayed waveguide is provided with the straight line section, a large scale circuit design becomes possible of such as 10-GHz-spaced 64 channels.

(Sixth Embodiment)

Figure 14:
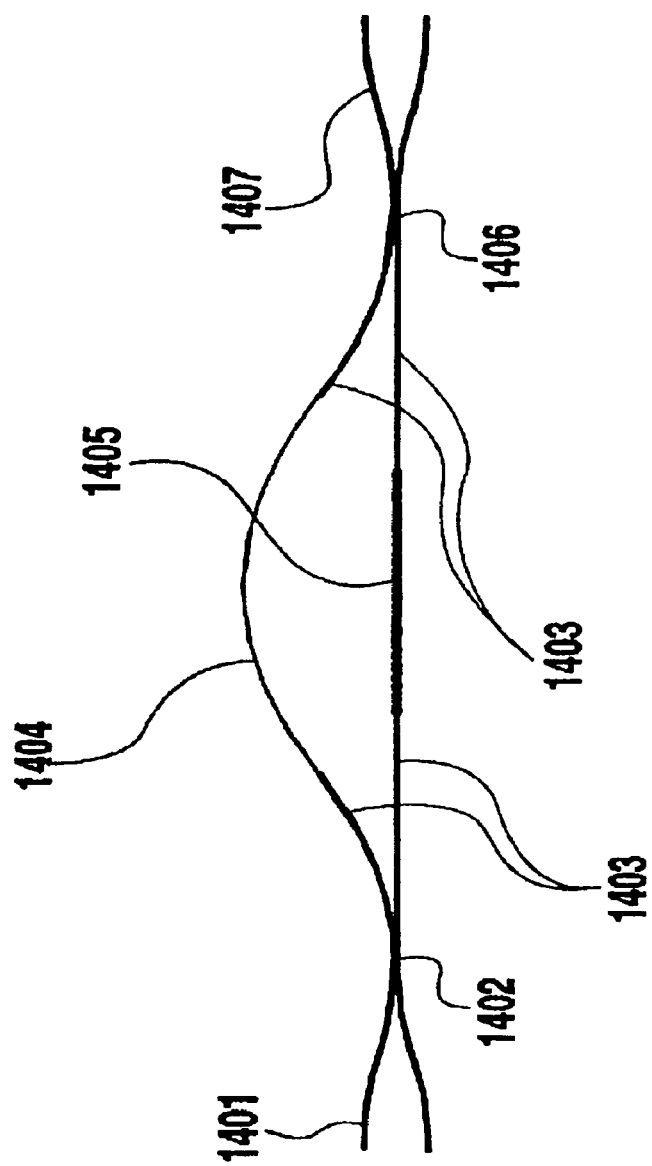
FIG. 14 is a schematic diagram showing a structure of a polarization-independent asymmetrical Mach-Zehnder interferometer of a sixth embodiment in accordance with the present invention.

FIG. 14 shows a structure of an asymmetrical Mach-Zehnder interferometer with a channel spacing of 100 GHz (FSR (Free Spectral Range) of 200 GHz) as a sixth embodiment in accordance with the present invention. The present embodiment is an application of the polarization-independent principle of the first embodiment to the asymmetrical Mach-Zehnder interferometer.

In FIG. 14, the reference numeral 1401 designates input waveguides with a core width of seven micrometers; 1402 designates an input side 50% directional coupler (optical coupler); 1403 designates arm waveguides with a core width of seven micrometers; 1404 designates an arm waveguide with a core width of six micrometers; 1405 designates an arm waveguide with a core width of eight micrometers; 1406 designates an output side 50% directional coupler; and 1407 designates output waveguides with a core width of seven micrometers. A tapered section that gradually changes its width is inserted between the waveguides with different core widths.

As shown in FIG. 14, the asymmetrical Mach-Zehnder interferometer structure of the present embodiment is configured by three core widths $w_1$=six micrometers, $w_2$=eight micrometers and $w_0$=seven micrometers for the two arm waveguides. Specifically, parts of the two arm waveguides 1403 with a core width of seven micrometers are replaced by the arm waveguide 1404 with a core width of six micrometers and the arm waveguide 1405 with the core width of eight micrometers, thereby differentiating the core widths.

The lengths $L(w_1)$ and $L(w_2)$ of the core widths $w_1$ and $w_2$ are given by the following equations (12) and (13).

$$L(w_1) = \frac{B(w_2)}{B(w_1) \cdot n_{TM}(w_2) - B(w_2) \cdot n_{TM}(w_1)} \cdot \frac{c}{FSR} \quad (12)$$

$$L(w_2) = \frac{B(w_1)}{B(w_1) \cdot n_{TM}(w_2) - B(w_2) \cdot n_{TM}(w_1)} \cdot \frac{c}{FSR} \quad (13)$$

where c is the speed of light. Since the waveguides 1403 with the core width $w_0$ are inserted into the two arm waveguides with the same length $L(w_0)$, they do not affect the interferometer. The waveguides 1403 with the core width $w_0$ are inserted with an eye to increasing the degree of design freedom of the optical circuit.

The present embodiment is designed such that $L(w_1)$= 2.96 mm and $L(w_2)$=1.92 mm.

Figure 15:
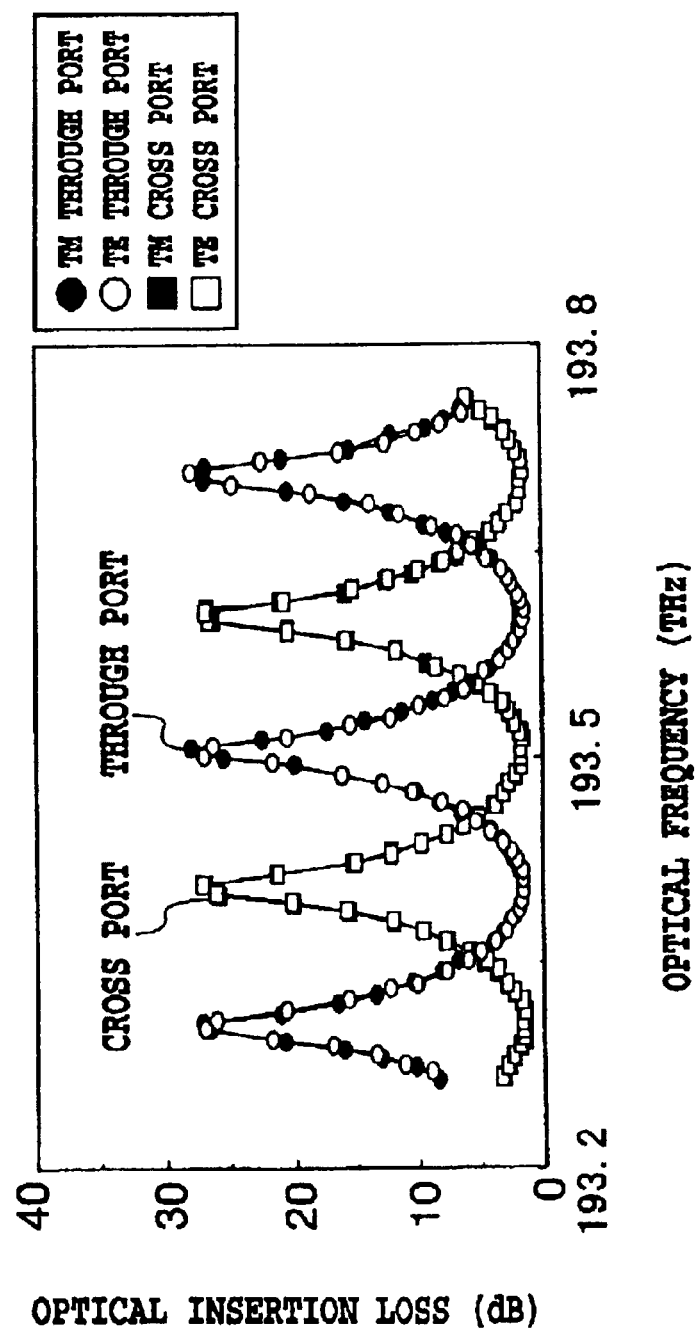
FIG. 15 is a graph illustrating transmittance spectrum characteristics of the polarization-independent asymmetrical Mach-Zehnder interferometer of the sixth embodiment in accordance with the present invention in terms of the relationships between the optical insertion loss and optical frequency.
Figure 16:
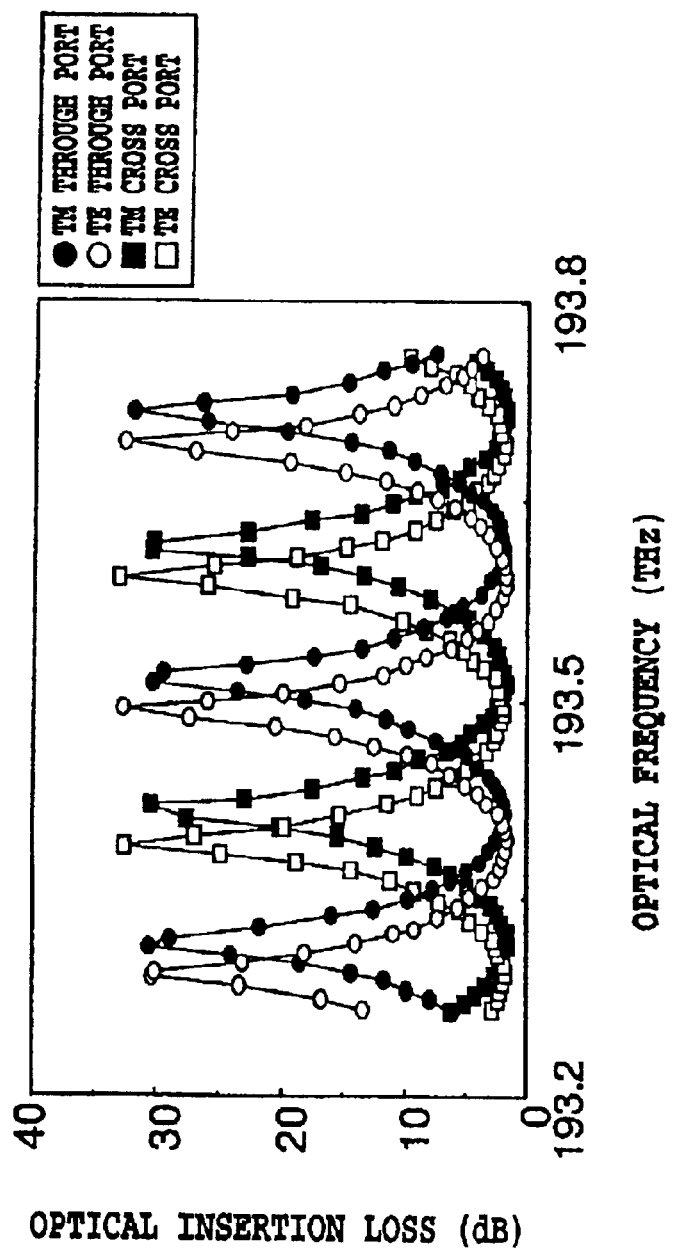
FIG. 16 is a graph illustrating transmittance spectrum characteristics of a conventional asymmetrical Mach-Zehnder interferometer (with a uniform core width of seven micrometers) in terms of the relationships between the optical insertion loss and optical frequency, as a comparison with the sixth embodiment in accordance with the present invention of FIG. 15.

FIG. 15 illustrates transmission spectra of an asymmetrical Mach-Zehnder interferometer fabricated in accordance with the foregoing design. For the purpose of comparison, FIG. 16 illustrates transmission spectra of a conventional asymmetrical Mach-Zehnder interferometer using only waveguides with a single core width of seven micrometers. As clearly seen from FIGS. 15 and 16, the asymmetrical Mach-Zehnder interferometer of the present embodiment eliminates the polarization dependence.

(Seventh Embodiment)

Figure 17:
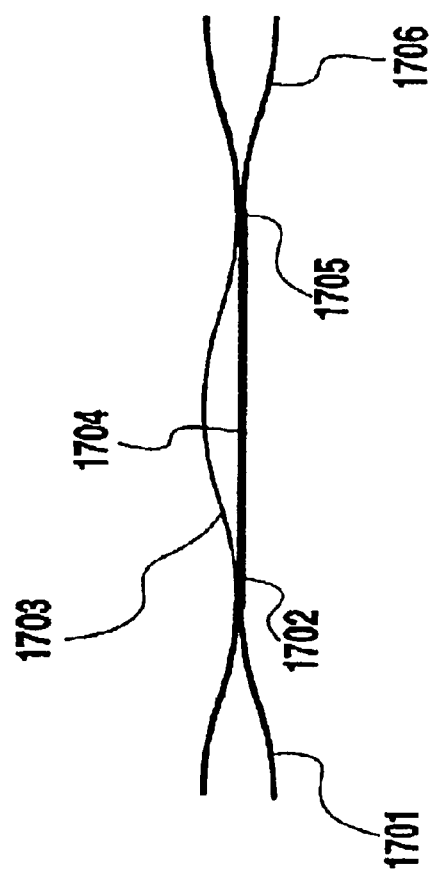
FIG. 17 is a schematic diagram showing a structure of a polarization beam splitter of a seventh embodiment in accordance with the present invention.

FIG. 17 shows a polarization beam splitter of a seventh embodiment in accordance with the present invention. In FIG. 17, the reference numeral 1701 designates input waveguides with a core width of seven micrometers; 1702 designates an input side 50% directional coupler; 1703 designates an arm waveguide with a core width of five micrometers; 1704 designates an arm waveguide with a core width of 10 micrometers; 1705 designates an output side 50% directional coupler; and 1706 designates output waveguides with a core width of seven micrometers.

The foregoing first to sixth embodiments in accordance with the present invention eliminate the polarization sensitivity of the AWG and the asymmetrical Mach-Zehnder interferometer. On the contrary, the present embodiment increases the polarization sensitivity of the Mach-Zehnder interferometer to implement a polarization beam splitter that changes the output port by polarization.

To implement the polarization beam splitter, it is necessary for the design to set the optical path difference of the TM light at $\lambda/2$, and that of the TE light at zero. The present embodiment uses the waveguide 1703 with a core width of $w_1$=five micrometers and the waveguide 1704 with the core width of $w_2$=10 micrometers. The conditions can be expressed by the following equations (14) and (15).

$$n_{TM}(w_1) \cdot L(w_1) - n_{TM}(w_2) \cdot L(w_2) = -\frac{\lambda}{2} \quad (14)$$

$$n_{TE}(w_1) \cdot L(w_1) - n_{TE}(w_2) \cdot L(w_2) = 0 \quad (15)$$

where $\lambda$ is an optical wavelength. Changing equations (14) and (15) gives the following equations (16) and (17) for obtaining $L(w_1)$ and $L(w_2)$.

$$L(w_1) = \frac{n_{TE}(w_2)}{n_{TE}(w_1) \cdot n_{TM}(w_2) - n_{TE}(w_2) \cdot n_{TM}(w_1)} \cdot \frac{\lambda}{2} \quad (16)$$

$$L(w_2) = \frac{n_{TE}(w_1)}{n_{TE}(w_1) \cdot n_{TM}(w_2) - n_{TE}(w_2) \cdot n_{TM}(w_1)} \cdot \frac{\lambda}{2} \quad (17)$$

According to equations (16) and (17), the arm waveguides 1703 and 1704 should be designed to have lengths $L(w_1)$ and $L(w_2)$ of 6.53 mm and 6.52 mm, respectively. As for a device actually fabricated in accordance with the foregoing conditions, it was confirmed that for the input light with an optical communication wavelength of 1.55 micrometers, it functions as a polarization beam splitter that outputted the TM light to a through port and the TE light to a cross port. The level of the TM light against the TE light at the cross port (the crosstalk of the polarization beam splitter) was −19 dB.

(Other Embodiments)

The foregoing embodiments in accordance with the present invention describe the optical interferometer using the silica-based glass waveguide on the silicon substrate. The principle of the present invention is also applicable even to the waveguide material such as polyimide, silicone, semiconductor and $LiNbO_3$. In addition, the substrate is not limited to silicon.

It is described in the foregoing embodiments in accordance with the present invention that the dependence of the birefringence on the core width results from the stress-induced birefringence. However, even if it results from the structural birefringence, the present embodiment can implement the polarization-independence or polarization sensitivity using the foregoing equations.

The foregoing embodiments in accordance with the present invention are described by way of example where the waveguide birefringence increases with the core width. However, even when the waveguide birefringence reduces with the core width on the contrary, the polarization sensitivity can also be eliminated if the core widths are designed to satisfy the foregoing equations.

The foregoing embodiments in accordance with the present invention use the silica-based optical waveguide on the silicon substrate. As with the silica-based optical waveguide on the silicon substrate, the birefringence usually becomes negative. In contrast, as with the polymer optical waveguide, the birefringence can take either positive or negative value depending on the material. For example, a polyimide optical waveguide gives positive birefringence, and silicone optical waveguide gives negative birefringence. Therefore, it is not uniquely determined in the AWG whether the core width of a longer arrayed waveguide is made wider or narrower than that of a shorter arrayed waveguide. In any case, however, it is enough that the core widths of the arrayed waveguides are determined to satisfy the foregoing equation (6).

The subject matter of the present invention is that the birefringence is dependent on the waveguide core width, and the polarization-independence or polarization sensitivity is implemented using this fact.

As described above, according to the present invention, simply varying the waveguide width makes it possible to accomplish the polarization-independent operation, or on the contrary to implement the polarization beam splitter.

Furthermore, according to the present invention, the half-wave plate of the first conventional technique used for achieving the polarization-independence of the AWG can be removed, thereby being able to offer a low cost AWG.

Moreover, according to the present invention, it is not necessary to use the compressive stress-free glass of the second conventional technique. Therefore, the optical circuit can be constructed by using the glass with the compressive stress. This offers an advantage of being able to greatly increase the reliability of the optical component such as weather resistance.

Industrial Applicability

As described above, the optical waveguide interferometer in accordance with the present invention is useful as the optical wavelength multi/demultiplexer for multiplexing the optical signals of a plurality of wavelengths at a transmitting side of the optical wavelength division multiplexing communication system, and for demultiplexing a plurality of optical signals passing through a single optical fiber into different ports at a receiving side of the system.

What is claimed is:

1. An optical waveguide interferometer composed of am-optical waveguides on a substrate, wherein
said optical waveguide interferometer comprises an optical branching section, a plurality of optical wave guides with different lengths, and an optical coupling section, and wherein
longitudinal integral values of birefringence of said plurality of optical waveguides are substantially equal to one another, and
core widths averaged in a longitudinal direction of said plurality of optical waveguides are wider in shorter optical waveguides and narrower in longer optical waveguides.

2. The optical waveguide interferometer as claimed in claim 1, wherein
said optical waveguide interferometer is an arrayed waveguide grating optical wavelength multi/demultiplexer including a first slab waveguide, a second slab waveguide, a plurality of arrayed waveguides that interconnect said slab waveguides and have different lengths from one another, at least one input waveguide connected to said first slab waveguide, and at least one output waveguide connected to said second slab waveguide, and wherein
core widths averaged in a longitudinal direction of said plurality of arrayed waveguides are wider in shorter optical waveguides and narrower in longer optical waveguides, and as a result of this,
longitudinal integral values of birefringence of said plurality of arrayed waveguides are equal to one another among said plurality of arrayed waveguides.

3. The optical waveguide interferometer as claimed in claim 2, wherein said plurality of arrayed waveguides each have a constant core width in said longitudinal directions except for connecting sections with said first and second slab waveguides.

4. The optical waveguide interferometer as claimed in claim 2, wherein said plurality of arrayed waveguides are each composed of waveguides with at least two-types of core widths except for connecting sections with said first and second slab waveguides, and a ratio between lengths of the waveguides with the at least two-types differs from one another among said plurality of arrayed waveguides.

5. The optical waveguide interferometer as claimed in claim 4, wherein said waveguides with the at least two-types of the core widths are interconnected by a tapered section individually that continuously changes its widths.

6. The optical waveguide interferometer as claimed in claim 4, wherein a tapered section interconnecting the waveguides with different core widths is composed of a plurality of waveguides that have different widths and are connected to one another serially.

7. The optical waveguide interferometer as claimed in claim 4, wherein said plurality of arrayed waveguides with different lengths from one another each include a straight line waveguide at the neighborhood of a central section.

8. The optical waveguide interferometer as claimed in claim 2, wherein said plurality of arrayed waveguides with different lengths from one another each include a straight line waveguide at the neighborhood of a central section.

9. The optical waveguide interferometer as claimed in claim 2, wherein said optical waveguide interferometer is composed of silica-based glass optical waveguides on a silicon substrate.

10. The optical waveguide interferometer as claimed in claim 2, wherein an internal stress of a core film constituting each optical waveguide of said optical waveguide interferometer is two times greater than an internal stress of an upper cladding film.

11. The optical waveguide interferometer as claimed in claim 1, wherein said optical waveguide interferometer is a Mach-Zehnder interferometer including two optical couplers, and two optical waveguides that interconnect said couplers and have different lengths, and wherein
said two optical waveguides have core widths different from each other at least in part, and
an averaged core width of the shorter waveguide is wider than an averaged core width of the longer waveguide.

12. The optical waveguide interferometer as claimed in claim 11, wherein said optical waveguide interferometer is composed of silica-based glass optical waveguides on a silicon substrate.

13. The optical waveguide interferometer as claimed in claim 11, wherein an internal stress of a core film constituting each optical waveguide of said optical waveguide interferometer is two times greater than an internal stress of an upper cladding film.

14. The optical waveguide interferometer as claimed in claim 1, wherein said optical waveguide interferometer is composed of silica-based glass optical waveguides on a silicon substrate.

15. The optical waveguide interferometer as claimed in claim 1, wherein an internal stress of a core film constituting each optical waveguide of said optical waveguide interferometer is two times greater than an internal stress of an upper cladding film.

16. An optical waveguide interferometer composed of optical waveguides on a substrate, wherein said optical waveguide interferometer is a Mach-Zehnder interferometer including two optical couplers, and two optical waveguides that interconnect said couplers and have different lengths, and wherein said two optical waveguides have core widths different from each other at least in part, and longitudinally integral values of birefringence of said two optical waveguides differ from each other by half optical wavelength used.

* * * * *